US012715742B2

(12) United States Patent
Herat et al.

(10) Patent No.: US 12,715,742 B2
(45) Date of Patent: Aug. 25, 2026

(54) MAPPING OF A CRANE SPREADER AND A CRANE SPREADER TARGET

(71) Applicant: AMLAB Pty Ltd, Osborne Park (AU)

(72) Inventors: Shanil Mario Herat, Stirling (AU); Andrew Pasquale, Murdoch (AU); En-Shan Looi, Bentley (AU)

(73) Assignee: AMLAB PTY LTD (AU)

( * ) Notice: Subject to any disclaimer, the term of this patent is extended or adjusted under 35 U.S.C. 154(b) by 678 days.

(21) Appl. No.: 18/014,829

(22) PCT Filed: Jul. 7, 2021

(86) PCT No.: PCT/AU2021/050724

§ 371 (c)(1),
(2) Date: Jan. 6, 2023

(87) PCT Pub. No.: WO2022/006629

PCT Pub. Date: Jan. 13, 2022

(65) Prior Publication Data

US 2023/0348237 A1 Nov. 2, 2023

(30) Foreign Application Priority Data

Jul. 7, 2020 (AU) ................................ 2020902337

(51) Int. Cl.
*B66C 13/46* (2006.01)
*B66C 13/48* (2006.01)
(Continued)

(52) U.S. Cl.
CPC .............. *B66C 13/46* (2013.01); *B66C 13/48* (2013.01); *G01S 7/4972* (2013.01); *G01S 17/894* (2020.01)

(58) Field of Classification Search
CPC ......... B66C 13/46; B66C 13/48; B66C 17/20; B66C 19/002; G01S 7/4972;
(Continued)

(56) References Cited

U.S. PATENT DOCUMENTS 6,845,873 B1 * 1/2005 Chattey .................... G01V 5/26 378/57
7,950,539 B2 * 5/2011 Henriksson ........... B66C 13/063 212/270
(Continued)

FOREIGN PATENT DOCUMENTS

DE 10251910 B4 3/2013
GB 2548899 A 10/2017
(Continued)

OTHER PUBLICATIONS

Nadar, M. et al.: "An Intelligent System for Monitoring Tower Cranes on Construction Sites", 30th International Symposium on Automation and Robotics in Construction and Mining, 23rd World Mining Congress, Aug. 2013 (Aug. 2013), Montreal, Canada, pp. 1239-1246, XP055894453, ISBN: 978-1-62993-294-1.

*Primary Examiner* — Michael Collins
(74) *Attorney, Agent, or Firm* — Renner, Kenner, Greive, Bobak Taylor & Weber Co. LPA

(57) ABSTRACT

The present invention relates to a method for the mapping of a crane spreader and a crane load target, the method comprising the steps of: capturing scan data using one or more backreach range scanning sensors located on a backreach area of the crane; capturing scan data using one or more boom range scanning sensors located on the crane boom; and aligning and combining the backreach scan data and the boom scan data to generate a mapping of the crane spreader and the crane load target.

20 Claims, 8 Drawing Sheets

Apparatus preferred embodiment view 1

(51) Int. Cl.
*G01S 7/497* (2006.01)
*G01S 17/894* (2020.01)

(58) Field of Classification Search
CPC ........ G01S 17/894; G01S 17/89; G01S 7/497; G01S 19/14; G01C 15/002; G01C 21/3807; G01C 25/00; G06T 2200/08; G06T 2207/10028; G06T 7/521
See application file for complete search history.

(56) References Cited

U.S. PATENT DOCUMENTS

| | | | | |
|---|---|---|---|---|
| 8,909,467 | B2 | 12/2014 | Lee | |
| 11,772,943 | B2 * | 10/2023 | Ishida | B66D 1/50 254/266 |
| 2005/0281644 | A1 | 12/2005 | Lussen | |
| 2008/0219804 | A1 * | 9/2008 | Chattey | B66C 19/002 414/140.3 |
| 2012/0089320 | A1 * | 4/2012 | Tan | G01S 19/42 342/146 |
| 2013/0013251 | A1 * | 1/2013 | Schoonmaker | B66C 15/04 702/152 |
| 2013/0147640 | A1 * | 6/2013 | Stocker | B66C 13/16 340/928 |
| 2013/0345857 | A1 * | 12/2013 | Lee | B66C 13/48 700/229 |
| 2014/0107971 | A1 | 4/2014 | Engedal | |
| 2021/0032080 | A1 * | 2/2021 | Wiethorn | G01W 1/10 |

FOREIGN PATENT DOCUMENTS

| | | | |
|---|---|---|---|
| RU | 2623295 | C2 | 6/2017 |
| WO | 2017168180 | A1 | 10/2017 |
| WO | 2017205916 | A1 | 12/2017 |

* cited by examiner

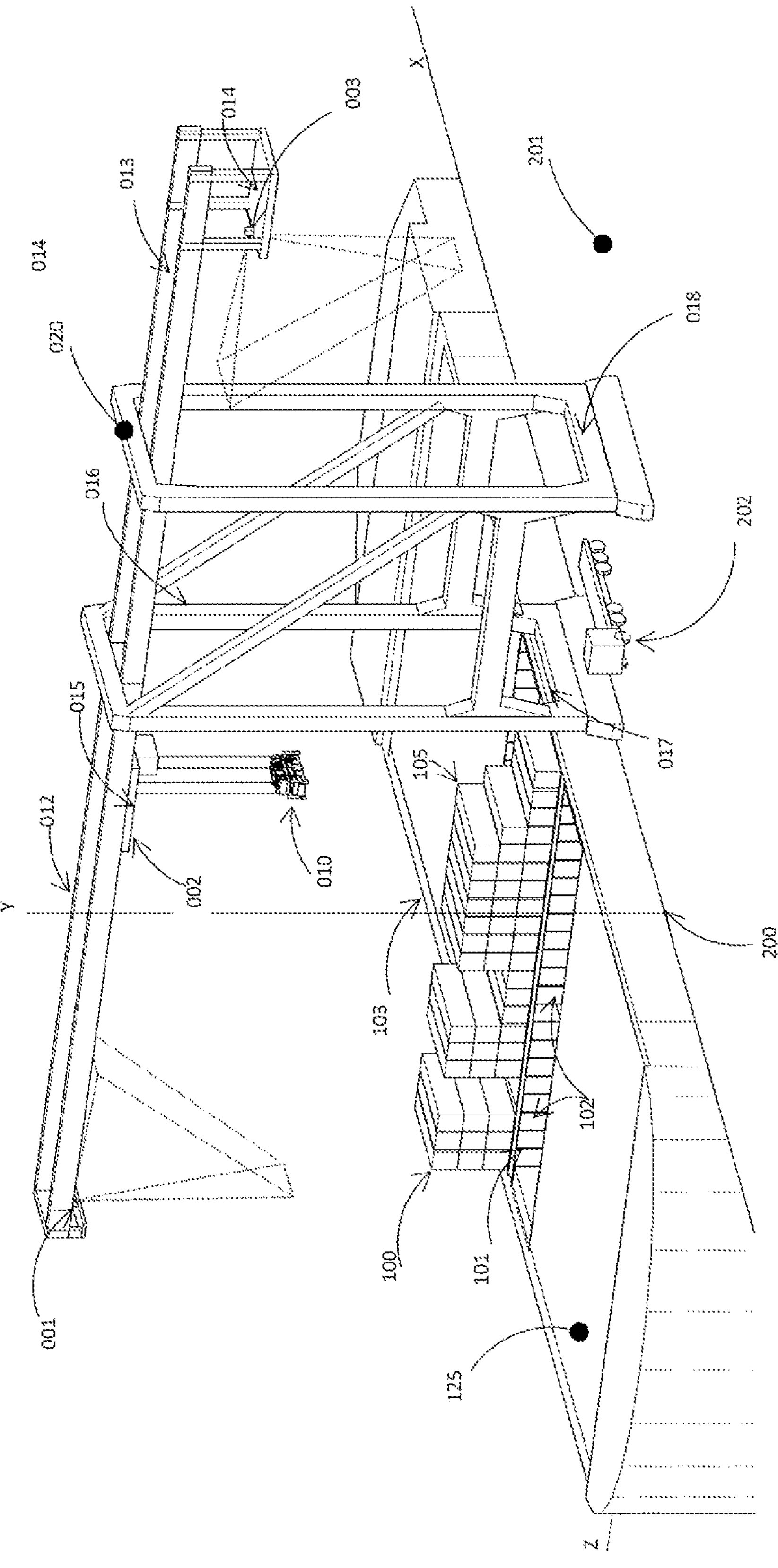
Figure 1: Apparatus preferred embodiment view 1

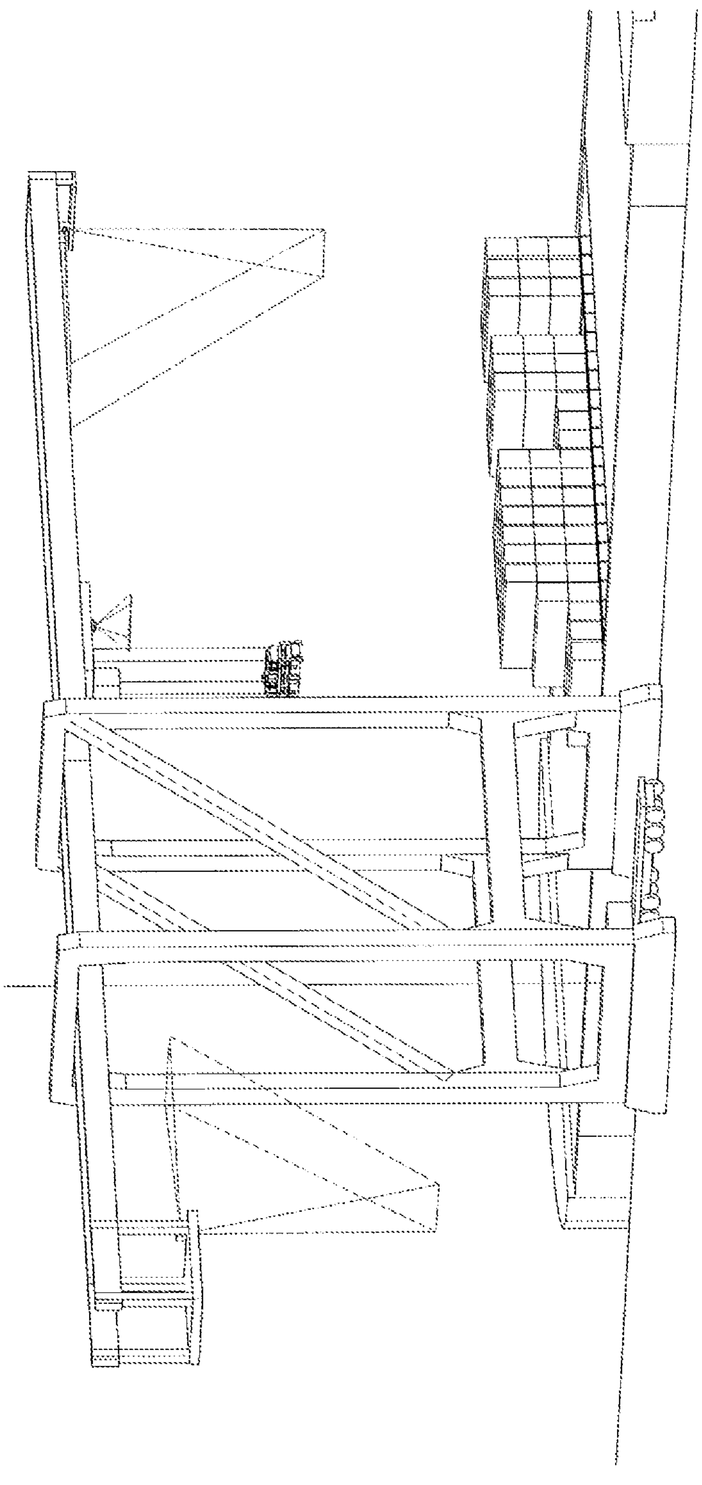
Figure 2: Apparatus preferred embodiment view 2

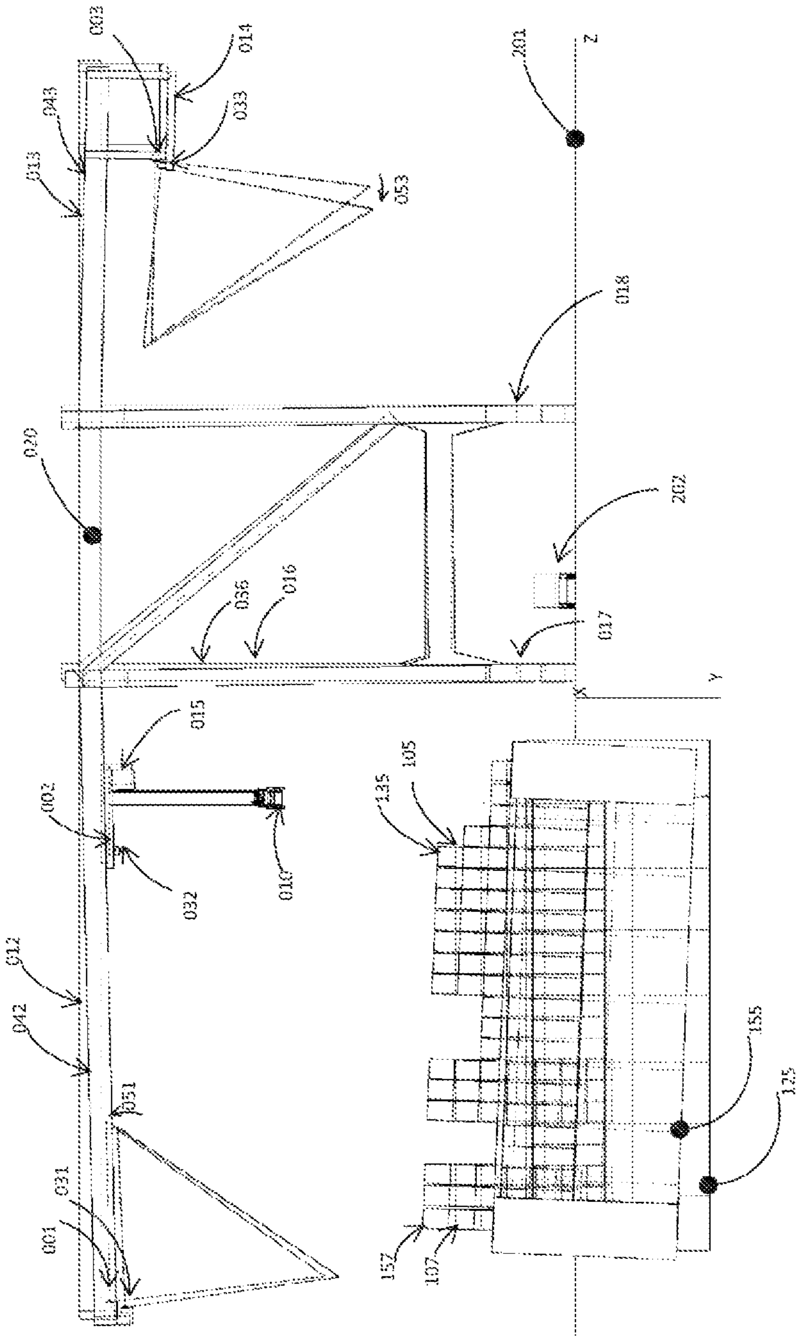
Figure 3: Ship motion and crane flex capture

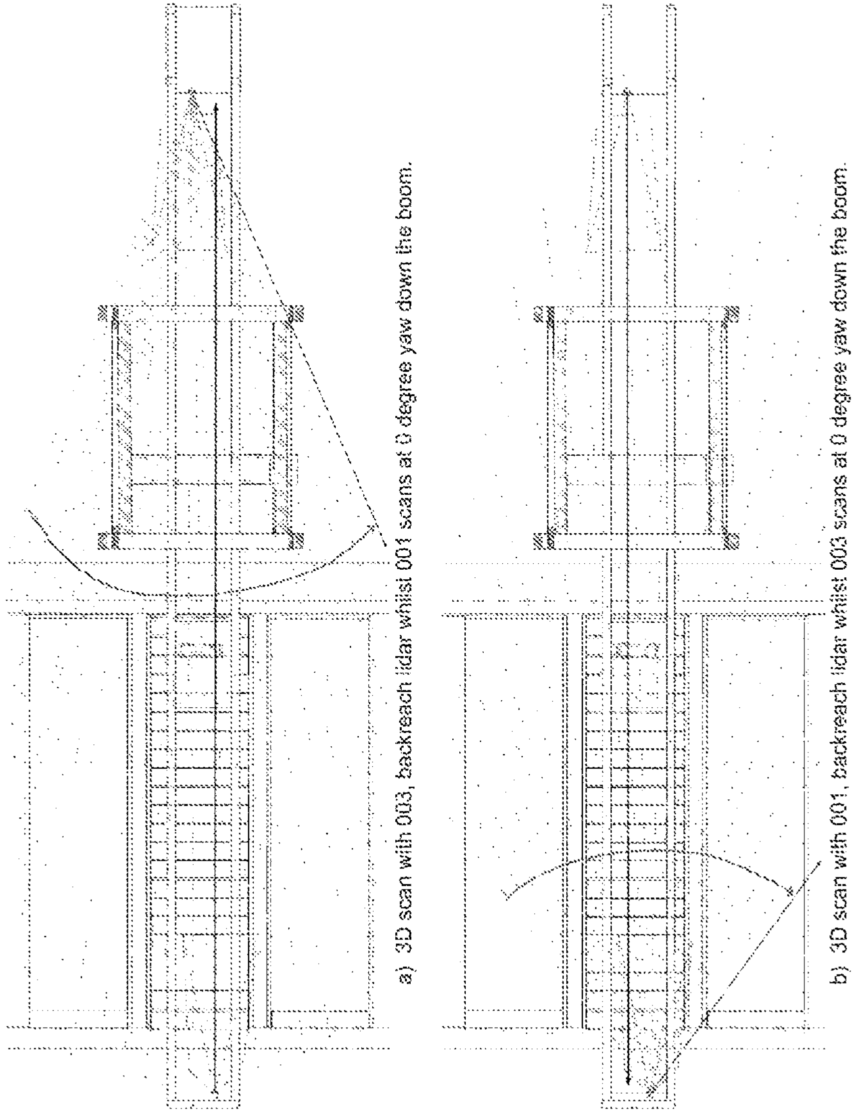
Figure 4: 2-Stage 3D scanning with dynamic lidar pair Crane and Ship tracking with stationary laser

Figure 5: Ship 3D scan

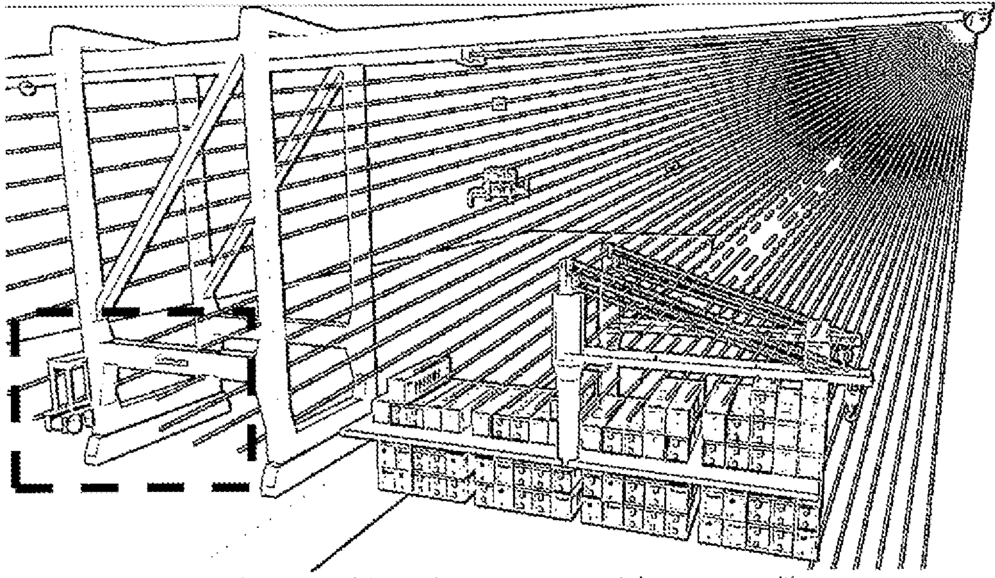
a) 001 2D vertical scanning of ship and crane structure at 0 degree yaw position.
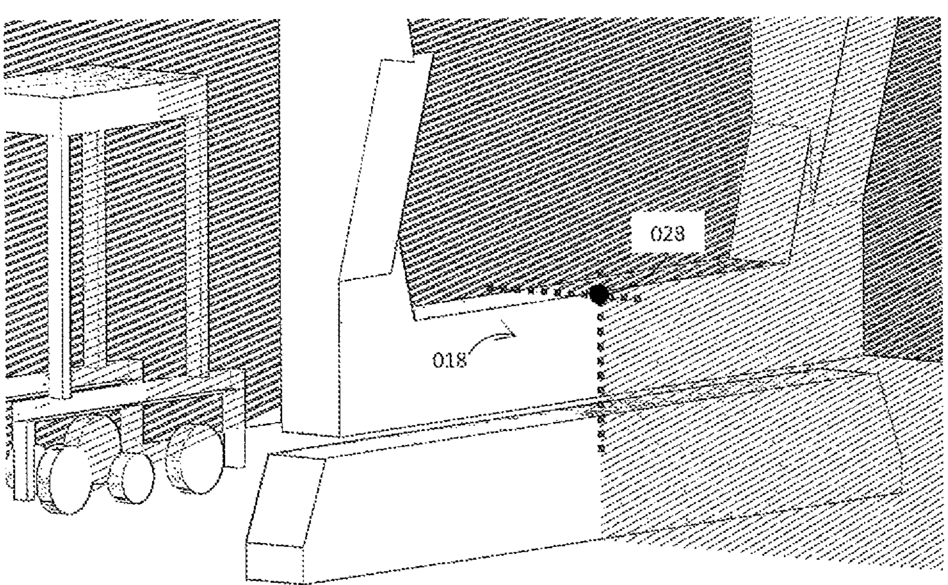
b) Inset: Sill beam 028 edge, being the intersection of two lines on the vertical and horizontal portions of the sill beam structure.
Figure 6: Sill beam measurements and edge tracking by 001 during 003 3D sweep.

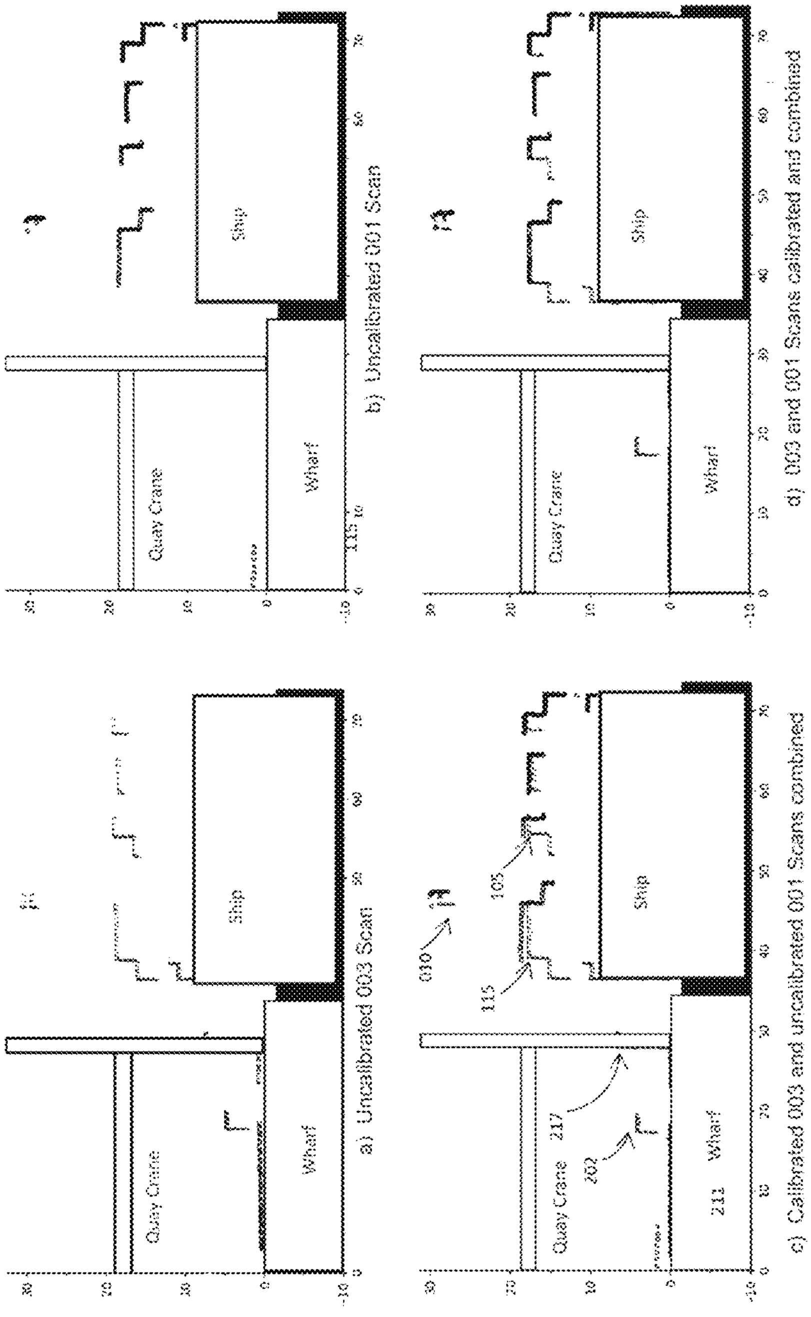
Figure 7: Illustration of uncalibrated measurments (1 degree error), and combination following dynamic callibration

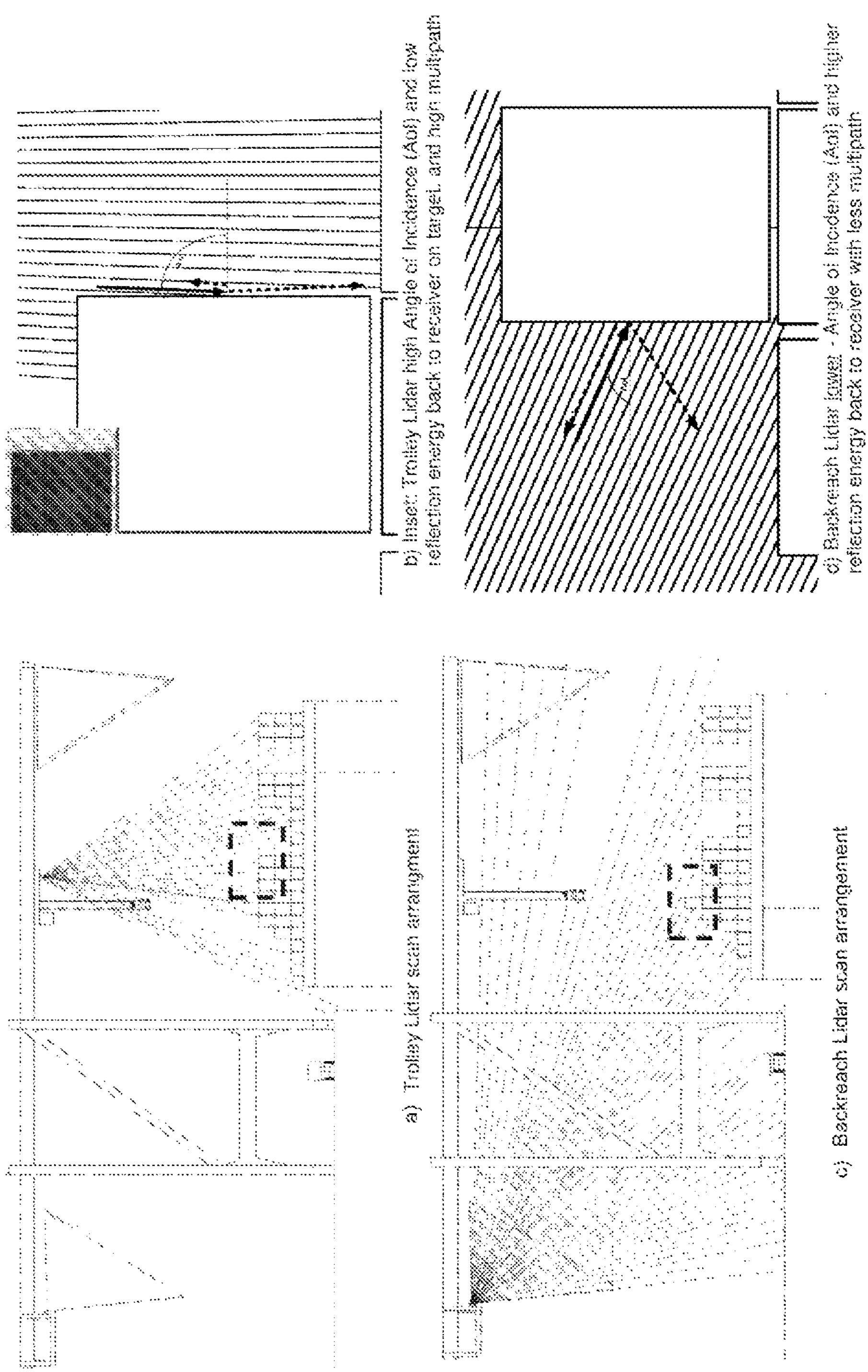
FIGURE 8: Illustration of backreach Lidar higher reflection energy and lower multipath energy compared to trolley mounted lidar.

MAPPING OF A CRANE SPREADER AND A CRANE SPREADER TARGET

TECHNICAL FIELD

The present invention provides a method for the mapping of a crane spreader and a crane load target. More specifically, the method of the present invention allows for the accurate tracking of the crane spreader and shipping container target positions during crane operations. The present invention further relates to a method of autonomously controlling a crane operation. The present invention further relates to a system for the mapping of a crane spreader and a crane load target.

BACKGROUND ART

The following discussion of the background art is intended to facilitate an understanding of the present invention only. The discussion is not an acknowledgement or admission that any of the material referred to is or was part of the common general knowledge as at the priority date of the application.

Seaborne cargo is the predominant means of transportation of materials and value-added products. At present, the majority of goods transport operations are controlled directly by a human. Variances such as operator skill and fatigue result in performance which is less than optimal. Additionally, when an error is made, the result can be dangerous and costly. Aside from the clear benefits of reducing incidents and stoppages, even marginal improvements in performance translates to significant increases in productivity when compounded across millions of containers moves across a terminal.

In the drive to reduce costs and time and increase efficiency and safety, automation is playing a pivotal role in the optimisation of operations. At some large terminals, many parts of container handling have been automated such as the automatic stacking cranes and transport to/from using automatic guided vehicles.

Fully autonomous container loading/unloading operations require the position of loading/unloading equipment to be accurately tracked. This requires the control system to be able to account for the motion of the crane spreader relative to the trolley and the moving pickup and drop off locations on the ship. This motion is affected by external forces such as winds, tides, ballasting and even changing load distribution caused by loading/unloading. The accurate tracking of the position also needs to account for the flex, bowing and sagging of the crane as the weight of the moving machinery on crane exert forces on the crane structure. As would be appreciated by a person skilled in the art, the sagging of the boom on certain crane types can be as much as 1 m and lateral rocking as much as 30 cm under high trolley loads. When this motion is compounded with the motion caused by other external forces, there can be a significant variance between the measured and actual spreader location, yielding an error impact that can impact operational efficiency or safety.

The current state of automation for cranes has generally been very data-intensive with similar Lidar and RADAR applications producing millions of data points that need to be processed in a very short amount of time for practical use in live operations. This results in very expensive processing hardware and computing power required. This has limited the ability of such systems to achieve full automation of the quay cranes with the desired speed and accuracy. Instead what is required is an augmented version of operations where human operators are still required for key parts of the crane operations. This requires multiple handovers between the human operator and the autonomous systems, leading to operational inefficiencies.

The methods used commonly in industry try to identify and position the spreader in absolute reference frames. That is to say, the common methodology used is to determine:

i. The position of the spreader relative to a fixed position on the wharf;
ii. The position of the target relative to a fixed position on the wharf; and
iii. The target trolley position relative to a fixed position on the wharf.

These are also often augmented with other encoders and sensing equipment in various parts of the crane, such as travel encoders on the wheels, trolley drive systems and rope drives for the spreader.

One problem with this methodology is that it is not accurate enough and can be a slow and time-consuming process. This also suffers compromises with current computing power used in industrial applications that is not appropriate for the level of scanning detail required.

(00101A common approach taken by other systems is to mount a sensor on the crane trolley in order to calculate the position of the crane spreader. The sensor is typically pointed down directly at the crane spreader, which provides high vertical accuracy. Despite this, difficulties are experienced in resolving the crane spreader or container position in the horizontal plane. As would be appreciated by a person skilled in the art, there is a greater need for accuracy in this direction than in the vertical direction. For example, to accurately place the spreader twist locks into the container corner castings, a horizontal accuracy of 5 cm or less is required. In comparison, the vertical accuracy can typically be 25 cm or greater, given the system's ability to lower down the crane spreader or container until contact is made. The poorer horizontal accuracy with trolley mounted systems results from a variety of Lidar characteristics; including:

a) Limited sensor angular resolution, for which the absolute horizontal precision becomes inversely proportional to range, and for the case of high modern cranes and typical scanners can limit measurement to ~7-30 cm intervals;
b) Lidar measurements on edges and associated ghosting effects, as the Lidar beam spreads with range, it can partially reflect off both container targets and background objects, which results in a false range estimate (ghosting) between the two;
c) Lidar beam spread on angled surfaces, as measurement error occurs at angles of high incidence due to the beam spot shape on the target surface, with the reflected energy causing a skew in peak intensity and Lidar scanner range estimation;
d) Reflection induced errors or complete loss of measurement at high angles of Lidar beam incidence, this disadvantage increases even more the closer the trolley moves to the actual load target, i.e. with the vertical downward measurements, the angle of incidence becomes even higher as the trolley moves over the target. This greatly limits relative positioning methods and what landing accuracy can be achieved, especially over a moving ship; and
e) Dark colored containers present further difficulties where the reflected beam presents a higher intensity return than the actual first target. This is made significantly more severe during wet weather, where surface wetness increases specular reflection and reduces diffuse reflection directly back to the range sensor.

Another major drawback of such systems is the error induced by the flex, bowing and sagging of the crane equipment during loading operations, which negatively affect the accuracy in which measurements can be made using apparatus mounted on a crane trolley. When there is movement (rotation or displacement) of the sensor during the scan, inaccuracies in measurement and thus control result.

A method is needed that increased the accuracy of positioning, whilst also ensuring that the data can be processed with sufficient speed to provide positioning for live operations.

Throughout this specification, unless the context requires otherwise, the word “comprise” or variations such as “comprises” or “comprising”, will be understood to imply the inclusion of a stated integer or group of integers but not the exclusion of any other integer or group of integers.

SUMMARY OF INVENTION

In accordance with a first aspect of the present invention, there is provided a method for the mapping of a crane spreader and a crane load target, the method comprising the steps of:

- capturing scan data of static reference structures using one or more backreach range scanning sensors located on a backreach area of the crane to determine the calibration parameters of the backreach range scanning sensors;
- capturing scan data of the crane spreader and the crane load target using the backreach range scanning sensors and translating same by the calibration parameters to obtain corrected backreach scan data;
- capturing scan data of reference features using one or more boom range scanning sensors located on the crane boom to determine calibration parameters of the boom range scanning sensors;
- capturing scan data of the crane spreader and the crane load target using the boom range scanning sensors and translating same by the calibration parameters to obtain corrected boom scan data;
- aligning and combining the corrected backreach scan data and the corrected boom scan data to generate a mapping of the crane spreader and the crane load target.

The inventors have found that by capturing scan data from a range scanning sensor located in the backreach area and a range scanning sensor located on the crane boom and combining both to generate a mapping, that the position of the crane spreader and the crane load target may be accurately tracked. Further, by calibrating each of the range scanning sensors against reference features, the alignment of both data sets is simplified. This has been found to increase the speed, reliability and/or accuracy in which the mapping is generated.

In one form of the present invention, the backreach range scanning sensors capture contour scan data of the static reference structures. In one form of the present invention, the backreach range scanning sensors capture contour scan data of the crane spreader and the crane load target. Preferably, the backreach range scanning sensors capture contour scan data of the static reference structures, the crane spreader and the crane load target.

In one form of the present invention; the boom range scanning sensors capture contour scan data of the reference features. In one form of the present invention, the boom range scanning sensors capture contour scan data of the crane spreader and the crane load target. Preferably, the boom range scanning sensors capture contour scan data of the static reference structures, the crane spreader and the crane load target.

In one form of the present invention, the method further comprises mapping of a crane spreader load, the method comprising the steps of:

- Capturing scan data of the crane spreader load using at least one of the backreach range scanning sensors or the boom range scanning sensors and translating same by the calibration parameters to obtain corrected scan data; and generating a mapping of the crane spreader load.

In one form of the present invention, the method further comprises mapping of a crane spreader load, the method comprising the steps of:

- Capturing contour scan data of the crane spreader load using at least one of the backreach range scanning sensors or the boom range scanning sensors and translating same by the calibration parameters to obtain corrected contour scan data; and
- generating a mapping of the crane spreader load.

In one form of the present invention, the method further comprises mapping of a crane spreader load, the method comprising the steps of:

- Capturing scan data of static reference structures using one or more backreach range scanning sensors located on a backreach area of the crane to determine the calibration parameters of the backreach range scanning sensors;
- capturing scan data of the crane spreader, the crane spreader load and the crane load target using the backreach range scanning sensors and translating same by the calibration parameters to obtain corrected backreach contour scan data;
- capturing scan data of reference features using one or more boom range scanning sensors located on the crane boom to determine calibration parameters of the boom range scanning sensors;
- capturing scan data of the crane spreader, the crane spreader load and the crane load target using the boom range scanning sensors and translating same by the calibration parameters to obtain corrected boom scan data; and
- aligning and combining the corrected backreach scan data and the corrected boom scan data to generate a mapping of the crane spreader, the crane spreader load, and the crane load target.

In one form of the present invention; the method further comprises mapping of a crane spreader load, the method comprising the steps of:

- capturing contour scan data of static reference structures using one or more backreach range scanning sensors located on a backreach area of the crane to determine the calibration parameters of the backreach range scanning sensors;
- capturing contour scan data of the crane spreader, the crane spreader load and the crane load target using the backreach range scanning sensors and translating same by the calibration parameters to obtain corrected backreach contour scan data;
- capturing contour scan data of reference features using one or more boom range scanning sensors located on the crane boom to determine calibration parameters of the boom range scanning sensors;
- capturing contour scan data of the crane spreader; the crane spreader load and the crane load target using the boom range scanning sensors and translating same by the calibration parameters to obtain corrected boom scan data; and aligning and combining the corrected backreach scan data and the corrected boom scan data to generate a mapping of the crane spreader, the crane spreader load, and the crane load target.

Preferably, the backreach range scanning sensors capture contour scan data of the crane spreader, the crane spreader load and the crane load target.

Preferably, the boom range scanning sensors capture contour scan data of the crane spreader, the crane spreader load and the crane load target.

In one form of the present invention, the mapping is a two dimensional mapping.

In one form of the present invention; the mapping is a three dimensional mapping. As would be understood by a person skilled in the art, a three dimensional mapping is a mathematical representation of the three dimensional surfaces of an object. The three dimensional mapping can be rendered as a two dimensional image or used in a computer simulation of physical phenomena. The three dimension mapping can also be used to identify key features of the object and to measure the position of key features. Without wishing to be bound by theory, the inventors have found that the measurement of the position of the key features is made more accurate by taking steps to mitigate sources of error during the mapping process.

Throughout this specification, unless the context requires otherwise, the term “scan data”, will be understood to refer to two or three dimensional positional information of an object obtained by an appropriate sensor. As would be appreciated by a person skilled in the art, the scan data will consist of a multitude of data points that can be used to identify the position of an object. The collected scan data can then be used to generate construct a digital two dimensional or three dimensional mapping of the object.

Throughout this specification, unless the context requires otherwise, the term “contour scan data”, will be understood to refer to two or three dimensional positional information of an object obtained by an appropriate sensor which is used to capture the shape of an object. As would be appreciated by a person skilled in the art, the scan data will consist of a multitude of data points that can be used identify the shape of an object. The collected contour scan data can then be used to generate construct a digital two dimensional or three dimensional mapping, and/or representation of the object.

Throughout this specification, unless the context requires otherwise, the term “backreach area” or variations, will be understood to refer to the areas of the crane that extends rear from the fenderline of the wharf.

In one form of the present invention, the backreach range scanning sensors capture scan data of the static reference structures, the crane spreader, and the crane load target simultaneously. Preferably, scan data of the crane spreader load is also simultaneously captured.

Throughout this specification, unless the context requires otherwise, the term “crane spreader” or variations, will be understood to refer to the means which engages the load to be picked up. Where the load is a shipping container, the crane spreader will typically include a locking mechanism for securing the shipping container to the crane spreader.

Throughout this specification, unless the context requires otherwise, the term “crane load target” or variations, will be understood to refer to a primary target of the crane. It should be understood that the crane load target will be dependent on the state of the crane. When the crane spreader is empty, the crane load target will be the load itself. When the crane spreader has engaged a load, the crane load target with refer to the loads target destination, Crane load targets include containers, ship cell guides, ship hatch covers, wharf locations and landside transports such as trucks or AGVs.

In one form of the present invention, the boom range scanning sensors capture scan data of the reference features, the crane spreader and the crane load target simultaneously. Preferably, scan data of the crane spreader load is also simultaneously captured.

In one form of the present invention, at least one of the backreach range scanning sensors are Light Detection and Ranging (Lidar) devices. Preferably, at least one of the backreach range scanning sensors are three dimensional Lidar devices. In an alternative form of the present invention, the backreach range scanning sensors comprise multiple 2D Lidar devices. In another form of the present invention, at least one of the backreach range scanning sensors are Radio Detection and Ranging (RADAR) devices. In an alternative form of the present invention, the backreach range scanning sensors comprise a 2D Lidar device mounted on a rotating mechanism. It should be understood that the one or more backreach range scanning devices may comprise a combination of one or more different types of range scanning devices.

In one form of the present invention, at least one of the backreach range scanning sensors is located rear of the front sill beams of the crane. Preferably, at least one of the backreach range scanning sensors is located rear of the rear sill beams. As would be appreciated by a person skilled in the art, the sill beams of a crane are the cross beams that connect the crane legs.

In one form of the present invention, at least one of the backreach range scanning sensors is at an approximate centre line between the crane sill beams.

In one form of the present invention, at least one of the backreach range scanning sensors is located such that at least a portion of a side of the crane spreader and the crane load target is in view. As would be appreciated by a person skilled in the art, the placement of a range scanning sensor at a direct centreline of the crane will only allow for a limited field of view. By providing at least one range scanning device in a position off the centreline, the total field of view can be increased to include the sides of the crane spreader and the crane load target.

In one form of the present invention, the static reference structures include one or more static crane structures. Preferably, one or more static crane structures are selected from sill beams, crane legs or crane leg cross beams.

In one form of the present invention, the static reference structures include one or loading bay features. Throughout this specification, unless the context requires otherwise, the term “loading bay” or variations, will be understood to refer to the area over which the crane operates. Where the crane is mounted on a wharf, the loading bay features include the wharf plane itself, the edge of the wharf itself or other structures on the wharf.

In one form of the present invention, the step of capturing scan data of static reference structures, more specifically comprises:

conducting a yaw sweep of the backreach range scanning sensor to capture raw scan data;

calculating the plane of the loading bay from the raw scan data; and rotating and translating the raw scan data to generate the scan data.

Preferably, only the raw scan data in the region of the crane is rotated and translated.

In one form of the present invention, the step of determining the calibration parameters of the backreach range scanning sensors, more specifically comprises calculation of the orientation and position of each backreach range scanning sensor with respect to a global origin. More preferably, the global origin comprises a Cartesian coordinate system which aligns the X/Y/Z axis to the length, height, width of the loading bay.

In one form of the present invention, the step of determining the calibration parameters of the backreach range scanning sensors, more specifically comprises calculating one or more of:

yaw calibration angle of the backreach range scanning sensor;

roll calibration angle of the backreach range scanning sensor;

pitch calibration angle of the backreach range scanning sensor; and xyz position of the backreach range scanning sensor.

In one form of the present invention, the yaw calibration angle of the backreach range scanning sensor is calculated with reference to the crane legs. Preferably, the yaw calibration angle of the backreach range scanning sensor is calculated with reference to the centreline between the crane legs.

In one form of the present invention, the roll calibration angle of the backreach range scanning sensor of the backreach range scanning sensor is calculated with reference to loading bay plane.

In one form of the present invention, the pitch calibration angle of the backreach range scanning sensor is calculated with reference to loading bay plane.

In one form of the present invention, the xyz position of the backreach range scanning sensor is calculated with reference to distance from static crane structures.

In one form of the present invention, at least one of the boom range scanning sensors are Light Detection and Ranging (Lidar) devices. Preferably, at least one of the boom range scanning sensors are three dimensional Lidar devices. In an alternative form of the present invention, the boom range scanning sensors comprise multiple 2D Lidar devices. In another form of the present invention, at least one of the boom range scanning sensors are Radio Detection and Ranging (RADAR) devices. In an alternative form of the present invention, the boom range scanning sensors comprise a 2D Lidar device mounted on a rotating mechanism. It should be understood that the one or more boom range scanning devices may comprise a combination of one or more different types of range scanning devices.

In one form of the present invention, at least one of the boom range scanning sensors is located at the distal end of the crane boom. The distal end of the crane boom should be understood to refer to the end of the boom opposite the backreach area. Additionally or alternatively, at least one of the boom range scanning sensors is located on the crane trolley. The crane trolly should be understood to refer to the apparatus which supports the crane spreader(s).

In one form of the present invention, least one of the boom range scanning sensors is at an approximate centre line of the boom.

In one form of the present invention, at least one of the boom range scanning sensors is located such that at least a portion of a side of the crane spreader and crane load target is in view.

In one form of the present invention, the reference features comprise one or more of the static reference structures. In one form of the invention the reference features are supplementary reference features that are visible to the backreach range scanning sensors. At times where the static reference structures are occluded from the boom range scanning sensors, it has been found that features visible to both the backreach range scanning sensors and the boom range scanning sensors may be used to calibrate the boom range scanning sensors. Suitable supplementary reference features include features of the crane spreader load and a crane load target.

In one form of the present invention, the step of determining the calibration parameters of the boom range scanning sensors, more specifically comprises calculation of the orientation and position of each boom range scanning sensor with respect to a global origin. More preferably, the global origin comprises a cartesian coordinate system which aligns the X/Y/Z axis to the length, height, width of the loading bay.

In one form of the present invention, the step of determining the calibration parameters of the boom range scanning sensors, more specifically comprises calculating one or more of:

yaw calibration angle of the boom range scanning sensor;

roll calibration angle of the boom range scanning sensor;

pitch calibration angle of the boom range scanning sensor; and xyz position of the boom range scanning sensor.

In one form of the present invention, the yaw calibration angle of the boom range scanning sensor is calculated with reference to the crane legs.

In one form of the present invention, the roll calibration angle of the boom range scanning sensor of the boom range scanning sensor is calculated with reference to the crane legs.

In one form of the present invention, the pitch calibration angle of the boom range scanning sensor is calculated with reference to visible static crane structures. Preferably, the crane structures are selected from back reach structure edges or sill beam edges.

In one form of the present invention, the xyz position of the boom range scanning sensor is calculated with reference to distance from static crane structures.

In one form of the present invention, the step of capturing scan data of the crane spreader, the crane spreader load and the crane load target more specifically comprises:

capturing scan data;

searching the scan data for one or more of the crane spreader, the crane spreader load and the crane load target to identify relevant regions;

extracting a selective subset of the scan data at the relevant regions.

In one form of the present invention, the method further comprises the step of tracking rotation and/or displacement of the backreach range scanning sensors to determine dynamic calibration parameters of the backreach range scanning sensors and rotating and translating the backreach range scanning sensors scan data by the dynamic calibration parameters. The inventors have found that the crane structure may be subjected to a number of displacements during operation, including the flex/bowing/sagging of the crane. This introduces a degree of rotational and displacement error into the range scanning sensor positions and consequently the scan data. The inventors have found that by tracking these movements that dynamic calibration parameters may be calculated, allowing for the scan data to be corrected.

In one form of the present invention, the step of tracking rotation and/or displacement of the backreach range scanning sensors more specifically comprises tracking the offset of key alignment features from a reference position. Preferably, the key alignment features are selected from the loading bay ground plane and the crane sill beams.

In one form of the present invention, the method further comprises the step of tracking rotation and/or displacement of the boom range scanning sensors to determine dynamic calibration parameters of the boom range scanning sensors and rotating and translating the boom range scanning sensors scan data by the dynamic calibration parameters. In one form of the present invention, the step of tracking rotation and/or displacement of the boom range scanning sensors more specifically comprises tracking the offset of key alignment features from a reference position. Preferably, the key alignment features are selected from the loading bay ground plane, the crane sill beams, key features of the crane spreader load and key features of the crane load target. The inventors have found that the loading bay and crane may be occluded from the view of the boom range sensors during the operation. At these times, the backreach range scanning sensors may be used as a reference. It has been found that key features of the crane spreader load and crane load target, particularly edges such as the ship edges or container edges, are suitable for the use as alignment features.

In accordance with a further aspect of the present invention, there is provided a system for the mapping of a crane spreader and a crane load target, the system comprising:

- one or more backreach range scanning sensors located on a backreach area of the crane;
- one or more boom range scanning sensors located on the crane boom; and
- a processing unit adapted to align and combine scan data from the backreach range scanning sensors and the boom range scanning sensors to generate a mapping of the crane spreader and the crane spreader load and the crane load target.

In one form of the present invention, the processing unit is adapted to compare scan data from backreach range scanning sensors and boom range scanning sensors against a global plane to determine calibration parameters for each backreach range scanning sensors and boom range scanning sensors. Preferably, the processing unit is further adapted to translate the scan data from each of the backreach range scanning sensors and boom range scanning sensors against the calibration parameters to obtain corrected boom scan data. More preferably, the processing unit is further adapted to align and combine the corrected backreach scan data and the corrected boom scan data to generate to generate the mapping of the crane spreader and the crane load target.

In one form of the present invention, the system further provides a mapping of a crane spreader load.

In one form of the present invention, at least one of the backreach range scanning sensors are Light Detection and Ranging (Lidar) devices. Preferably, at least one of the backreach range scanning sensors are three dimensional Lidar devices. In an alternative form of the present invention, the backreach range scanning sensors comprise multiple 2D Lidar devices. In another form of the present invention, at least one of the backreach range scanning sensors are Radio Detection and Ranging (RADAR) devices. In an alternative form of the present invention, the backreach range scanning sensors comprise a 2D Lidar device mounted on a rotating mechanism.

In one form of the present invention, at least one of the backreach range scanning sensors is located rear of the front sill beams of the crane. Preferably, at least one of the backreach range scanning sensors is located rear of the rear sill beams.

In one form of the present invention, at least one of the backreach range scanning sensors is located such that a side of the crane spreader and crane spreader target is in view. In one form of the present invention, at least one of the boom range scanning sensors are Light Detection and Ranging (Lidar) devices. Preferably, at least one of the boom range scanning sensors are three dimensional Lidar devices. In an alternative form of the present invention, the boom range scanning sensors comprise multiple 2D Lidar devices. In another form of the present invention, at least one of the boom range scanning sensors are Radio Detection and Ranging (RADAR) devices. In an alternative form of the present invention, the boom range scanning sensors comprise a 2D Lidar device mounted on a rotating mechanism.

In one form of the present invention, at least one of the boom range scanning sensors is located at the distal end of the crane boom. Additionally or alternatively, at least one of the boom range scanning sensors is located on the crane trolley.

In one form of the present invention, least one of the boom range scanning sensors is at an approximate centre line of the boom.

In one form of the present invention, at least one of the boom range scanning sensors is located such that a side of the crane spreader and crane spreader target is in view.

In accordance with a further aspect of the present invention, there is provided a method for the operation of a crane, the method comprising the steps of:

- generating a mapping of a crane spreader and a crane load target using the method described above;
- operating the crane; and
- continuously tracking the crane spreader and the crane load target.

In one form of the present invention, the method further comprises the step of generating a mapping of a crane load target. Preferably, the method comprises the step of continuously tracking the crane load target.

Preferably, the step of operating the crane is conducted autonomously.

Preferably, the step of continuously tracking the crane spreader; the crane spreader load and the crane load targets more specifically comprises tracking the dynamic calibration parameters of the crane.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which;

FIG. 1 is an upper perspective view of the use of the method of the present invention to create a three dimensional mapping of the ship bay 103;

FIG. 2 is a reversed upper perspective view of the method shown in FIG. 1;

FIG. 3 is an elevation view of the use of the method of the present invention in calculating ship orientation and motion, and compensating for crane flex;

FIG. 4 is a plan view of the use of the method of the present invention to account for the orientation of the ship when capturing contour data;

FIG. 5 documents experiment outcomes for the 3D capture of the ship using Lidar 003;

FIG. 6 is a perspective view illustrating the sill beam measurement and edge tracking by 001 during the 003 sweep;

FIG. 7 documents experiment outcomes and illustrates Lidar measurement and reference edge tracking allowing dynamic calibration;

FIG. 8 illustrates the backreach Lidars side view which allows higher reflection energy to be returned to the receiver than a trolley mounted lidar.

DESCRIPTION OF EMBODIMENTS

In FIGS. 1 to 4, there is shown a method for the three dimensional mapping of a crane spreader; a crane spreader load and preferably a crane load target. Whilst reference is made to a three dimensional mapping, it is envisaged by the inventors that the method could easily be adapted to generate one or more two dimensional mappings. In the embodiment shown in the Figures, this method is shown with reference to a crane 020 mounted on a wharf 201 used for the loading/unloading of shipping containers from ship 125. The crane comprises generally of a central supporting framework mounted on the wharf 201. A crane boom is mounted on the central supporting framework in a manner which allows the boom to extend out from the wharf above ships. A crane trolley is mounted on the boom in a manner that allows it to be moved along the crane boom. A crane spreader is suspended from the crane trolley which is used to engage with and pick up the shipping containers. The crane further comprises a backreach area which allows the shipping container to be picked up or dropped off to the wharf. The method of the present invention is adapted to provide a three dimensional mapping of the crane spreader; a crane spreader load (the shipping container; or cell guide, or land vehicle) and the crane load target with respect of the wharf. This allows for the relative position and orientation of each of these features to be accurately measured. Once the three dimensional mapping has been created, it can be used to guide the control of the crane operations. It is envisaged by the inventors that the accuracy of the three dimensional mapping will permit the autonomous control of at least a substantial portion of the loading/unloading process. As would be appreciated by a person skilled in the art, such operations require a high degree of accuracy in order for the crane spreader to be located on the shipping container and for the shipping container to then be moved to the crane load target. It is envisaged that in certain embodiments, the mapping of the crane load target may not be required. For example, the crane may have predetermined drop off routines which do not require the accurate scanning of the crane load target.

The method of the present invention utilises scan data from two or more range scanning sensors. In a preferred embodiment, the range scanning sensors are three dimensional Lidar devices. Each of the range scanning sensors output a three dimensional point cloud data set relative to each sensor. In a preferred embodiment of the present invention, the range scanning devices capture contour scan data. The following discussion has been made with specific reference to an embodiment of the present invention where contour scan data is captured. The present invention should not be considered as limited to the capture of contour scan data. As would be appreciated by a person skilled in the art, other types of scan data may be used to generate an appropriate mapping of an object, or representation of an object. Suitable mapping technologies include digital elevation models, polygonal models (such as Triangulated irregular networks), high density voxel grids, octrees or other types of K-d trees. These technologies could be similarly incorporated into the method of the present invention.

At least one of the range scanning sensors is located at the backreach area of the crane with respect to the crane. This range scanning sensor is positioned in a manner that allows the components of the crane to be scanned. In the embodiment shown in FIGS. 14, a single scanning device is mounted in the backreach area and is hereafter referred to as the backreach ranging sensor 003. It is preferred that the backreach ranging sensor 003 is mounted such that a side of the crane spreader and crane load target is in view of the backreach ranging sensor 003. The inventors have found that by positioning the backreach ranging sensor 003 such that the crane spreader and crane spreader target is scanned from the side, the better range precision and accuracy of the sensor can be leveraged for the measurements taken in the horizontal plane. This has been found by the inventors to provide greater accuracy for the positioning of the crane's spreader engagement means, such as twist locks into container corner castings.

Without wishing to be bound by theory, the greater accuracy is understood to be due to a number of factors.

A first factor is the much higher range precision versus angular precision of typical Lidar scanners. Due to the mounting location of the backreach ranging sensor 003, at least a portion of the side of the crane spreader or spreader target remains in its view. This leverages the much better range precision of the scanners in the horizontal direction. This is advantageous compared to the lower precision angular measurement of horizontal position that would be performed by a sensor in a downward facing arrangement, such as with a trolley mounted sensor.

A further advantage of the mounting position of the backreach ranging sensor 003 is the lower angle of incidence in the horizontal direction. As would be appreciated by a person skilled in the art, the sensor beam area increases with distance from the target. Where the target surface is angled, the spread of the beam across the target is skewed which leads to associated errors. The inventors have found that the position of the backreach ranging sensor 003 provides a lower angle of incidence in the horizontal direction which suffers a reduced impact from the beam spread on vertical surfaces. This has been found to reduce and stabilise the associated error. In comparison, the horizontal measurement accuracy of trolley mounted Lidars becomes worse the closer the trolley moves to the intended target due to this effect, thus reducing accuracy at the critical times of load pickup, especially on a moving ship or flexing crane.

The low angles of beam incidence have also been found to avoid reflection induced errors that occur at high angles of beam incidence. As would be appreciated by a person skilled in the art, both diffuse and specular reflections reach the receiver when the incidence angle is high, such as would be experienced by a downward facing sensor mounted on a trolley. This can lead to reflection induced errors that result from signals that have reflected from multiple surfaces. The inventors have found that by providing a lower incidence angle, the number of specular reflections which reach the receiver is reduced, thereby minimising errors that result from such reflections.

FIG. 8 illustrates a how the mounting position of the backreach ranging sensor 003 (FIGS. 8*c* and 8*d*) provides a decreased angle of incidence compared to a ranging sensor mounted on the trolley (FIGS. 8*a* and 8*b*). As shown in FIGS. 8*c* and 8*d*, the location of the backreach scanner away from the ship allows a side view of the spreader and ship containers. This results in a much lower angle of incidence for the Lidar beams striking the spreader and container vertical surfaces, leading to higher diffuse reflection back to the scanner and reduced specular reflection away from the scanner. This has been found to greatly improve the Lidar signal to noise ratio, and increases the scanner measurement accuracy in the horizontal direction. Similarly, it can avoid the problem of a complete lack of measurement which can plague trolley mounted Lidar systems that scan the containers at high angles of incidence where they result in a major or complete specular reflection.

At least one of the range scanning sensors is located on the crane boom. This range scanning sensor is positioned in a manner that allows for the crane spreader to be in view throughout at least a substantial portion of the crane spreader operation. The inventors have found that it is preferable to mount at least one range scanning sensor on the distal end of the crane boom. Alternatively or additionally, the range scanning sensor mounted on the crane boom is mounted on the crane trolley. In the embodiment shown in FIGS. 14, this range scanning sensor is mounted on the tip of the crane boom is hereafter referred to as the boomtip ranging sensor 001. The inventors have also found that by positioning the boomtip ranging sensor 001 at the distal end of the boom it is able to scan the sides of the crane spreader and the crane spreader targets. This provides similar benefits to the accuracy of the scan as discussed above.

The position and orientation of boomtip ranging sensor 001 and backreach ranging sensor 003 are such that their field of view takes advantage of the natural high accuracy range measurement of Lidar technologies, and avoids rather their poorer angular resolution and the error effects incurred by the width of the Lidar beam spot size as it spreads over distance. The optimised mounting of boomtip ranging sensor 001 and backreach ranging sensor 003 allows for container stack occlusion effects to be minimised in comparison to either end alone and allows a more complete and reliable stack profile measurements to be captured. Furthermore, the use of two separate sensors allows for a degree of redundancy should a sensor fail during operation.

In the embodiment shown in FIGS. 14, a further range scanning sensor is mounted on the crane trolley and hereafter referred to as the trolley ranging sensor 002. The trolley ranging sensor 002 is directed towards the crane spreader. Whilst not essential, the inventors have found it beneficial to supplement the data from sensors 001 and 003 with data from the trolley ranging sensor 002. This is especially useful in situations where the crane spreader of the crane load target may be occluded from the view of the either or both of the backreach range scanning sensors and boom range scanning sensors.

In order for the scan data captured by each range scanning sensor to be properly aligned, the exact position and orientation of each range scanning sensor must be accurately known. This can be difficult to calculate when the range scanning sensors are mounted at locations that are subject to movements or displacements during the operation of the crane. A number of natural displacements and rotations that are present during crane operations are exemplified in FIG. 3. These include:

- Crane boom sagging (downward displacement and pitch rotation around X axis) and general vibration, illustrated by the movement of 012 to 042. Notably this has a corresponding impact on the displacement and rotation of the boomtip ranging sensor 001 to 031 and the trolley ranging sensor 002 to 032;
- Crane backreach section sagging (downward displacement and pitch rotation around X axis) and vibration, illustrated by the movement of 013 to 043. Notably this has a corresponding impact on the displacement and rotation of backreach ranging sensor 003 to 033; and
- Crane lateral bowing and rocking (displacement in Z axis and pitch rotation around the X axis), illustrated by the movement of 016 to 036. Notably this has a corresponding impact on the displacement and rotation of all ranging sensors 001, 002 and 003;

To overcome the errors induced by the displacements and rotations, the method of the present application seeks to ensure that this displacement and rotation is accurately calculated in order to derive a set of calibration parameters. Scan data captured by the ranging sensors may then be rotated and translated by the calibration parameters to account for this movement. The inventors have found that that various static components of the crane and wharf may be used as static reference structures that allow for calibration parameters to be calculated.

In order to calibrate each range scanning sensor, a total station survey is undertaken in order to establish a global origin 200. A Cartesian coordinate system is established, aligning the X/Y/Z axis to the length, height, width of the wharf. This forms the framework around which all rotations, translations and geometric line plane calculations are computed. The position and orientation of the ranging sensors 001, 002, and 003 may be calculated with respect to the global origin 200. The position and orientation may then be updated by encoders and/or GPS, The global position of the point data captured by each ranging sensors 001, 002, and 003 can be obtained by rotating and translating each point cloud dataset by the respective sensor position and orientation relative to the global origin 200. This will account for any yaw/pitch/roll angle of the sensor.

The position and orientation of the backreach ranging sensor 003 and the boomtip ranging sensor 001 is such that their field of view captures within the point cloud dataset static features of the wharf and or the crane. Such static features can include the loading equipment legs 016, sill beams 017, 018 and the ship deck 103. Each ranging sensor 003/001 will capture scan data of one or more static features in order to establish a reference plane on which the wharf, ship and loading equipment main features lie. Although numerous features are listed in the Figures, it is not necessary to capture three dimensional point cloud data of all features, but only a sufficient number of points to confidently establish the reference plane.

At least three non-collinear points are required to establish the reference plane. In practice, more non-collinear points may be obtained, enabling filtering, refinement and cross checking to be performed. Many approaches exist for selecting three non-collinear points on the wharf 201, ship 125 and crane 020. Numerous algorithms exist including open source software such as "Point Cloud Library™" for segmentation of point cloud data into homogenous regions, in particular planes, that is described at "https://pcl.readthedocs.io/projects/tutorials/en/latest/planar segmentation.html #planar-segmentation". Alternatively, with the boomtip and backreach Lidar scanning environment relatively known, sill beams 017/018, trucks 202 and container(s) (e.g. 100 and

105) being of rectangular volume, many shortcuts can be applied to dataset to yield the planar sections for each item of interest.

Instead of three dimensional Lidar devices, several 2D Lidar sensors could alternatively be used in various horizontal and vertical plane combinations to obtain the same information. For example, an array of sensors could be directed towards the ship 125 from the loading equipment 020 to allow for any occlusion that may need to be overcome or to allow for varying vessel sizes if handling both small to large vessels where a one size fits all solution may be inappropriate. An array of sensors on the loading equipment 020 also allows for greater availability and safety where a voting system can be used to provide cross checking and fault tolerance to any particular Lidar sensor failure which is very important for fully autonomous control.

The inventors have found that the identification of the reference plane may be assisted by taking advantage of the particular static features that a visible to each sensor. This permits the extraction of information from pre-configured targets, allowing other information to be ignored. This increases the speed of the calculation and reduces the computer processing power required to perform the calculation. It is envisaged that the calculations may be assisted further by installing reference targets and or markings on the various static reference structures.

In a preferred embodiment, the backreach ranging sensor 003 is positioned between the crane legs 036, The inventors have found that the centreline between the crane legs 036 may be used to assist in determining any crane boom deflections in a direction horizontally perpendicular to rail (crane yaw). Furthermore, the backreach ranging sensor 003 will maintain a view of the wharf and this will provide a reference for the calculation of any crane boom pitch and twist.

The crane legs 036 are also used by the boomtip ranging sensor 001 as reference to calculate any crane boom deflections in a direction horizontally perpendicular to rail (crane yaw) and twisting of the crane boom. Further, by directing the boomtip ranging sensor 001 directly down the line of the crane boom, any visible reference structures may be used to calculate the pitch of the crane boom. It is envisaged that the static reference structures of the crane may not always be visible to the boomtip ranging sensor 001, it is envisaged that any other structures that overlap with the view of backreach ranging sensor 003 may be used to calibrate the pitch.

Once translation and deflection of each ranging sensor with respect to the reference plane have been calculated, each of these parameters may be compiled into calibration parameters. The calibration parameters provide a point cloud rotation and translation matrix which allows for the point cloud data collected by each sensor to be corrected by the sensor yaw/pitch/roll angle calibration parameters. Standard means by which to compile suitable translation matrix and the transformation of scan data with the translation matrix known to those skilled in the art may be employed. Suitable examples include open source software such as Libpointmatcher™ developed by Francois Pomerleau and Stéphane Magnenat (available at https://github.com/ethz-asl/libpointmatcher and rigid_transform_3D™ developed by Nghia Ho (available at https://github.con-Vnghiaho12/rigid_transform_3D) which is based the rigid 3D transform algorithm discussed in "Least-Squares Fitting of Two 3-D Point Sets", Arun, K. S. and Huang, T. S. and Blostein, S. D, IEEE Transactions on Pattern Analysis and Machine Intelligence, Volume 9 Issue 5, May 1987. Once the calibration parameters of the ranging sensors 001/003 have been derived, scan data of the crane spreader, the crane spreader load and the crane load target may be captured by each ranging sensor 001/003. The point cloud data captured by each sensor is subsequently rotated and translated by the calibration parameters. The two calibrated point clouds can then be aligned and combined to generate a three dimensional mapping.

A number of means by which to align and combine the two data sets are known to those skilled in the art. The inventors have found that the iterative closest point (ICP) algorithm is particularly well suited to the alignment of the point clouds. Examples of open source software that implements the ICP algorithm for finding the rotation and translation matrix between two point clouds, examples include Point Cloud Library™ (available at https://pointclouds.org/), CloudCompare™ developed by Daniel Girardeau-Montaut (available at https://www.danielgm.net/cc/) and MeshLab™ developed by the ISTI-CNR Research Center (available at www.meshlab.net).

Where the crane spreader load and/or the crane load target are on land, it could be assumed that these will not move significantly throughout the scan. However, where the method of the present invention is used in respect of loading and unloading of shipping containers from a ship, such as shown in the Figures, one or more of the crane spreader load and/or the crane load target will be located on the ship. The ship will typically be subjected to water motion and this motion must be accounted for in order for the crane operations to be accurately monitored. As shown in FIG. 3, the ship heave (upward displacement) and list (roll rotation around X axis), illustrated by the movement of 125 to 155. The ship heave and list naturally translate to a displacement and rotation of the containers onboard, illustrated by the movement of 107 to 157, and 105 to 135.

During the calibration of ranging sensor 003, ship listing and heave may be tracked by ranging sensor 001 by way of relative measurement of key ship container edges (e.g. 107 motion to 157) or deck edge 103 and static references features, such as crane sill beams 018 (refer to FIG. 6) or back reach section structures (014). These tracked motions may be used to counter the effects of motion blur during the ranging sensor 003 calibration. Similarly, during the calibration of ranging sensor 001, ship listing and heave may be tracked by ranging sensor 003.

As would be appreciated by a person skilled in the art, three dimensional mapping systems require the object to be stationary throughout a scan of the object. When there is movement of the target or sensor during the scan, motion blur is experienced and the three dimensional image is distorted. In order to account for motion blur, the method of the present invention may include further means by which to account or correct for the movement of one or more features. Such means include, for example, the use of an object template as discussed in WO2017/205916.

The crane spreader and preferably the crane trolley must be continuously measured and tracked. This is achieved by searching the combined scan data for the crane spreader and the crane trolley. The speed of this search may be increased by limiting the search area to within the expected travel area.

Once the three dimensional mapping has been generated, the container loading/unloading operation may be commenced. Given the high load masses and acceleration forces during container movement operations, the Lidars are subject to large vibrations and rotational noise errors. Similarly, the crane structure itself is also subject to flex/bowing/sagging and this induces a degree of rotational and displacement error into the Lidar positions and consequently their point cloud measurements, To counteract these induced errors, continuous tracking of the rotation and/or displacement of the sensors 001/003 is performed to calculate dynamic calibration parameters. The contour scan data of each sensor may be transformed by the dynamic calibration parameters to correct for the errors. In one embodiment, the dynamic calibration parameters may be applied to the contour scan data captured by individual sensor 001/003 prior to alignment and combination. Alternatively, the dynamic calibration parameters may be applied to the combined data sets.

The inventors have found that the rotation and/or displacement of the sensors 001/003 may be tracked by tracking the offset of key alignment features from a reference position. A number of features within the sensors 001/003 can be used to track this rotation and/or displacement. The inventors have found that the wharf ground plane 211 and the sill beams 217 are particularly useful for this. The inventors have found that the loading bay and crane may be occluded from the view of the boom range sensors 001 during the operation of the crane. At these times, the backreach range scanning sensor 003 may be used as a reference. It has been found that key features of the crane spreader load and crane load target, particularly edges such as the ship edges or container edges, are suitable for the use as alignment features. It is envisaged that the calculation speed may be increased by locating the key features from the raw contour scan data.

Example 1

With reference to Figures, a method for the three dimensional mapping of a crane trolley, a crane spreader, a crane spreader load and a crane load target and the subsequent use of the mapping as a guide for the unloading and loading of the crane spreader load in accordance with the present invention will now be described.

As described above, the method shown in the Figures utilises a plurality of range scanning sensors to produce a three dimensional mapping of a crane trolley, a crane spreader, a crane spreader load and a crane load target. The plurality of sensors comprises of a boom ranging sensor 001, a backreach ranging sensor 003 and potentially a trolley ranging sensor 002. In this embodiment, each of the sensors 001, 002 and 003 output a three dimensional point cloud relative to each sensor In order to start operations, the crane gantry is positioned to the centre of the required wharf bay.

Once at the new bay position, a 3D point cloud scan with backreach ranging sensor 003 can be performed to derive its calibration parameters. As the spreader target is on a ship, the calibration process also includes steps to account for ship movement. Typical calibration steps include:

Yaw the backreach ranging sensor 003 across the bay, either by mechanical or optical azimuth steering of the Lidar scan plane(s) as illustrated in FIG. 4*a*, to generate a 3D point cloud 003_3DPC_Raw from the aggregation of 2D vertical scans. During the backreach ranging sensor 003 yaw sweep, boom ranging sensor 001 is kept yawed at 0 degrees and performs continuous two-dimensional vertical scans (001_2DPC_PYZ_SH) to counter the effects of motion blur from the ship:

As the crane is not in operation, crane pitching, roll or yaw flex is considered negligible during this time. Similarly, given the speed of the sweep, the amount of ship surge, yaw and trim is also considered negligible. Ship listing and heave can be significant however, even with tight mooring lines, and this is tracked with boom ranging sensor 001 via relative measurement of key ship container edges (e.g. 107 motion to 157) or deck edge 103, and crane sill beams 018 (refer to FIG. 6) or back reach section structures (014);

Scans 001_2DPC_PYZ_SH are processed into line contours and templates; from which the ship list (001_WC_SH_ListAng) and heave (001_WC_SH_Y_Heave) are tracked to counter the effects of motion blur during the backreach ranging sensor 003 sweep;

During the backreach ranging sensor 003 sweep, the 003_3DPC_Raw point cloud in the region of the ship is list rotated by 001_WC_SH_ListAng and translated by 001_WC_SH_Y_Heave to generate a corrected 3D point cloud of the ship and recorded as 0033DPCPYZSH;

FIG. 5 illustrates the output of such a scan; with ship deck; containers and cell guides clearly visible and able to be tracked;

Next, using the 003_3DPC_Raw point cloud; specifically in the wharf region of interest, the wharf 201 plane equation is derived. A weighted least square's approximation (or similar method) is used to derive the wharf plane equation from the list of wharf measurements between the sill beams, or from the plane derived between the sill beam walkways themselves; amongst other options.

The 003_3DPC_Raw point cloud in the region of the crane is then pitch rotated and translated to generate a corrected 3D point cloud of the crane as 003_3DPC_PYZ_CR, using the wharf 201 plane equation as a stable calibration reference.

Once the backreach ranging sensor 003 calibration scan has been captured, the calibration parameters to correct the backreach ranging sensor 003 yaw/roll angle from any bracket or crane flex; and any XYZ displacement from bowing or sagging, can be performed. Typical steps include:

Using the centreline between the crane legs 036 as reference (within preconfigured target areas), search 003_3DPC_PYZCR and find the 0 degree yaw angle (003_WC_Y_Ang) of the crane (horizontally perpendicular to rail). Save 003_WC_Y_Ang as a yaw calibration angle to the 003 sensor received data;

Using the wharf plane as reference find the 0 degree roll angle (003_WC_R_Ang) of backreach ranging sensor 003 bracket alignment vertically perpendicular to the wharf plane. Save 003_WC_R_Ang as a roll calibration angle to the sensor received data;

Then yaw backreach ranging sensor 003 to 0 degrees, down the line of the boom;

Using wharf ground plane 201 as a reference, record the pitch calibration angle (003_WC_P_Ang) to apply to backreach ranging sensor 003 mounting angle using the wharf plane as a reference;

Then using 003_Y/P/R_Ana angles and distance measurements from sill beams edges 017 and 018, back calculate the backreach ranging sensor 003 XYZ position (003_WC_XYZ_0) relative to the crane's front sill beam point of reference 017;

Compile the point cloud rotation and translation matrix (003_SC_RnT) for backreach ranging sensor 003 using 003_WC_Y_Ang, 003_WC_R_Ang, 003_WC_P_Ang and 003_WC_XYZ_0.

Once backreach ranging sensor 003 has been calibrated, a 3D scan with boom ranging sensor 001 to derive its calibration parameters can be performed. Typical steps include:

Yaw the boom ranging sensor 001 across the new bay, as illustrated in FIG. 4*b*, to generate a 3D point cloud 001_3DPC_Raw from the aggregation of 2D vertical scans, as depicted in FIG. 5. During the boom ranging sensor 001 yaw sweep, backreach ranging sensor 003 is kept yawed at 0 degrees and performs continuous two-dimensional vertical scans (003_2DPC_PYZ_SH) to counter the effects of ship motion blur;

As the crane is not in operation, crane pitching, roll or yaw flex is considered negligible during this time. Similarly, given the speed of the sweep, the amount of ship surge, yaw and trim is also considered negligible. Ship listing and heave can be significant however; even with tight mooring lines, and this is tracked by backreach ranging sensor 003 via relative measurement of key ship container edges (e.g. 105 motion to 135), and crane sill beams edges 017 and 018 (refer to FIG. 6);

Scans 003_2DPC_PYZ_SH are processed into line contours and templates, from which the ship list (001_WC_SH_List_Ang) and heave (001_WC_SH_Y_Heave) are tracked to counter the effects of motion blur during the boom ranging sensor 001 sweep;

During the boom ranging sensor 001 sweep, the 001_3DPC_Raw point cloud in the region of the ship is list rotated by 003_WC_SH_ListAng and translated by 003_WC_SH_Y_Heave to generate a corrected 3D point cloud of the ship and recorded as 001_3DPC_PYZ_SH.

Once the calibration scan has been captured, the calibration parameters to correct the boom ranging sensor 001 yaw/pitch/roll angle from any bracket or crane flex, and any XYZ displacement from bowing or sagging, can be performed. Typical steps include:

Using Crane legs as reference (pre-configured target areas), search 001_3DPC_Raw and find the 0 degree yaw angle (001_WC_Y_Ang) of the crane (horizontally perpendicular to rail). The 001_WC_Y_Ang is saved as a yaw calibration angle to the sensor received data;

Using the crane legs as reference find the 0 degree roll angle (001_WC_R_Ana) of boom ranging sensor 001 alignment (vertically perpendicular to rail). The 001_WC_R_Ang is saved as a roll calibration angle to the sensor received data;

Then yaw boom ranging sensor 001 to face 0 degrees, down the line of the boom;

Using the back reach structure edges (014) or sill beam edge (028), or any other with structures that overlap with backreach ranging sensor 003 field of view (e.g. even container edges) find the pitch calibration angle to apply to boom ranging sensor 001 mounting angle;

Then using 001_YiP/R_Ang calculate the boom ranging sensor 001 installation position (001_WC_XYZ_O) relative to the cranes back reach (014) or sill beam 018 points of reference;

Compile the point cloud rotation and translation matrix (001_SC_RnT) for boom ranging sensor 001 using 001_WC_Y_Ang, 001_WC_R_Ang, 001_WC_P_Ang and 001_WC_XYZ_O.

Once the calibration parameters of the backreach ranging sensor 003 and the boom ranging sensor 001 have been derived, the 001 and 003 3D point clouds can be aligned and combined to mitigate the effects of ranging occlusions from ship structures. Typical steps include:

Using 003_SC_RnT matrix, rotate and translate 003_3DPC_PYZ_SH to save a roll and yaw corrected point cloud (003_3DPC_WC_SH) of the ship;

Using 003_SC_RnT matrix, rotate and translate 003_3DPC_PYZ_CR to save a roll and yaw corrected point cloud (003_3DPC_WC_CR) of the crane;

Using 001_SC_RnT matrix, rotate and translate 001_3DPC_PYZ_SH to save a pitch, roll and yaw corrected point cloud (001_3DPC_WC_SH) of the ship;

Using 001_SC_RnT matrix, rotate and translate 001_3DPC_Raw to save a roll and yaw corrected point cloud (001_3DPC_WC_CR) of the crane;

Using a selective subset of the point clouds from 001_3DPC_WC_SH and 003_3DPC_WC_SH in a specific region of the ship or crane, determine the rotation and translation matrix (001_003_WC_RnT) to match 001_3DPC_WC_SH to 003_3DPC_WC_SH using various algorithms previously mentioned;

Rotate and translate 001_3DPC_WC_SH using (001_003_SC_RnT matrix) as point cloud 001_3DPC_003_SH;

Combine ship point clouds 003_3DPC_WC_SH and 001_3DPC_003_SH into 3DK_WC_SH.

Once the 001 and 003 point clouds have been aligned in yaw, pitch and roll, and corrected for any displacement various features required for the operation of the crane may be extracted from the point cloud data. In this embodiment, a safe height for trolley and hoisting motions can then be determined. Typically, this can be performed by searching the point cloud 3DPC_WC_SH, and capturing the safe height and centre of bay using minimum height algorithms across the Z dimension. The initial safe height can be based on a common 45 ft container width, with subsequent operations varying with the load width being carried.

As discussed above, the range sensors 001/003 are subject to large vibrations and rotational noise errors. Similarly, the crane structure itself is also subject to flex/bowing/sagging and this induces a degree of rotational and displacement error into the sensor 001/003 positions and consequently their point cloud measurements. To counteract these induced errors, continuous tracking of the stable wharf ground planes and crane sill beams edges is performed to provide a reference dynamic rotation and transformation to apply to the point clouds. Typical steps include:

With backreach ranging sensor 003 yawed stationary at 0 degrees, providing continuous 2D or 3D scans of the ship, crane and wharf area, rotate and translate the raw backreach ranging sensor 003 scan data using the static calibration 003_SC_RnT matrix determined prior, and store as a statically calibrated 2D point cloud 003_2DPC_SC. This is illustrated in FIG. 7*c:*

Then throughout operations, continuously search 003_2DPC_SC point measurements for the wharf ground plane (211) and the sill beams (217), determine the dynamic pitch reference angle θ03_DC_P_Ang and translation offset 003_DC_YZ 0, then rotate and translate 003_2DPC_SC and store as a dynamically corrected 2D point cloud 003_2DPC_WC.

Similarly, with boom ranging sensor 001 yawed stationary at 0 degrees, providing continuous 2D vertical scans of the ship, crane and wharf area, rotate and translate the raw boom ranging sensor 001 scan data using the static calibration 001_SC_RnT matrix determined prior, and store as a statically calibrated 2D point cloud 001_2DPC_SC.

Depending on operational circumstances, boom ranging sensor 001 can be occluded from viewing the wharf and crane sill beams. In these scenarios, using the backreach ranging sensor 003 correct point cloud as a reference, and at least key edges from the ship, the boom ranging sensor 001 is calibrated to the backreach ranging sensor 003 point cloud by the following method.

1. Dynamically locate at least two key alignment targets, e.g. ship containers or crane spreader from 003_2DPC_M and 001_2DPC_SC as illustrated in FIG. 7.
2. Using the two alignment features from 003_2DPC_WC and 001_2DPC_SC, determine the rotation and translation matrix (001_003_SC_RnT) to match 001_2DPC_SC and 003_2DPC_WC.
3. Furthermore, the boom ranging sensor 001 and backreach ranging sensor 003*s* are offset slightly in the X direction, which allows the edge of the ship deck or containers to be tracked and thus measure ship yaw or trim changes dynamically. Similarly, to counter the effects of ship surge, 002 scans across the containers or cell guides in the X direction and provides update to the safe height model.

Following the determination of the boom ranging sensor 001 yaw, pitch and roll and XYZ offsets to apply to the boom ranging sensor 001 point cloud, rotate and translate 001_2DPC_SC using (001_003_SC_RnT matrix) as point cloud 001_2DPC_WC.

Finally, combine point clouds 003_2DPC_WC and 001_2DPC_WC into 2DPC_WC, that being an aligned, high accuracy point cloud continuously calibrated to the wharf coordinate frame for both wharf side and sea side measurements.

Once the ship and wharf point clouds have been dynamically calibrated, there is a requirement to continuously measure and track the trolley (015) and spreader (010) for safe and efficient operations. Typical steps include:

Search 2DPC_WC point cloud and find trolley (015) within the vertical area of its expected horizontal travel using line contour and template techniques.

Similarly search 2DPC_WC point cloud and find spreader (010) within the horizontal area of its expected vertical range.

Once the trolley, spreader and wharf and ship objects have been measured, calibrated, and tracked, unloading or loading operations can now commence. Typical steps for unloading include:

Read the requested pick up row and tier (105), the estimated position from ship model, and the drop off lane or truck position (202) from the TOS/PLC.

Initiate trolley and hoist motion to the container 105 pick-up row and tier (for example), whilst taking into account the safe height matrix determined prior.

Continuously compare spreader 010 and container 105 relative positions using the calibrated and aligned point cloud 2DPC_WC.

As the spreader 010 nears the 105 target position, dynamically adjust the trolley and hoist speed control using the relative 010 to 105 position measurements, whilst taking into consideration the trolley 015 to spreader 010 sway angle.

Upon positioning the spreader above the 105 target and placing and securing twist locks into the corner castings, then hoist and trolley the 105 container to the 202 drop off lane.

As the spreader nears the 202 target position, dynamically adjust the trolley and hoist speed control using the relative 010 to 202 position measurements, whilst taking into consideration the trolley 015 to spreader 010 sway angle.

Upon positioning the container above the 202 target position, release the twist locks and drop off the container at 202 position.

The unloading process can now repeat.

Following completion of bay unloading, the ship loading operation is conducted in the same way, but with a reverse of the general steps used for the unloading operation.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

The invention claimed is:

1. A method for the mapping of a crane spreader and a crane load target, the method comprising the steps of:

capturing scan data of static reference structures using one or more backreach range scanning sensors located on a backreach area of the crane to determine the calibration parameters of the backreach range scanning sensors;

capturing scan data of the crane spreader and the crane load target using the backreach range scanning sensors and translating same by the calibration parameters to obtain corrected backreach scan data;

capturing scan data of reference features using one or more boom range scanning sensors located on the crane boom to determine calibration parameters of the boom range scanning sensors;

capturing scan data of the crane spreader and the crane load target using the boom range scanning sensors and translating same by the calibration parameters to obtain corrected boom scan data; and aligning and combining the corrected backreach scan data and the corrected boom scan data to generate a mapping of the crane spreader and the crane load target.

2. A method according to claim 1, wherein the one or more backreach range scanning sensors capture contour scan data of the static reference structures, the crane spreader and the crane load target.

3. A method according to claim 1, wherein the one or more boom range scanning sensors capture contour scan data of the reference features, the crane spreader and the crane load target.

4. A method according to claim 1, the method further comprises mapping of a crane spreader load, the method comprising the steps of:

capturing scan data of the crane spreader load using at least one of the backreach range scanning sensors or the boom range scanning sensors and translating same by the calibration parameters to obtain corrected scan data; and generating a mapping of the crane spreader load.

5. A method according to claim 1, wherein the mapping is a three dimensional mapping.

6. A method according to claim 1, wherein at least one of the backreach range scanning sensors are Light Detection and Ranging (Lidar) devices.

7. A method according to claim 1, wherein the static reference structures include one or more static crane structures.

8. A method according to claim 1, wherein the step of capturing scan data of static reference structures, more specifically comprises:

conducting a yaw sweep of the backreach range scanning sensor to capture raw scan data;

calculating a plane of the loading bay from the raw scan data; and rotating and translating the raw scan data to generate the scan data.

9. A method according to claim 1, wherein the step of determining the calibration parameters of the backreach range scanning sensors, more specifically comprises calculation of the orientation and position of each backreach range scanning sensor with respect to a global origin.

10. A method according to claim 1, wherein at least one of the boom range scanning sensors are Light Detection and Ranging (Lidar) devices.

11. A method according to claim 1, wherein at least one of the boom range scanning sensors is located at the distal end of the crane boom.

12. A method according to claim 1, wherein the reference features comprise one or more of the static reference structures or one or more supplementary reference features.

13. A method according to claim 1, wherein the step of determining the calibration parameters of the boom range scanning sensors, more specifically comprises calculation of the orientation and position of each boom range scanning sensor with respect to a global origin.

14. A method according to claim 1, wherein the method further comprises the step of tracking rotation and/or displacement of the backreach range scanning sensors to determine dynamic calibration parameters of the backreach range scanning sensors and rotating and translating the backreach range scanning sensors scan data by the dynamic calibration parameters.

15. A method according to claim 1, wherein the method further comprises the step of tracking rotation and/or displacement of the boom range scanning sensors to determine dynamic calibration parameters of the boom range scanning sensors and rotating and translating the boom range scanning sensors scan data by the dynamic calibration parameters.

16. A system for the mapping of a crane spreader and a crane load target, the system comprising:

a crane comprising a crane boom and a crane spreader;

one or more backreach range scanning sensors located on a backreach area of the crane;

one or more boom range scanning sensors located on the crane boom; and a processing unit adapted to align and combine scan data from the backreach range scanning sensors and the boom range scanning sensors to generate a mapping of the crane spreader and the crane load target.

17. A system according to claim 16, wherein the processing unit is adapted to compare scan data from backreach range scanning sensors and boom range scanning sensors against a global plane to determine calibration parameters for each backreach range scanning sensors and boom range scanning sensors.

18. A system according to claim 16, wherein the processing unit is further adapted to translate the scan data from each of the backreach range scanning sensors and boom range scanning sensors against the calibration parameters to obtain corrected backreach scan data and corrected boom scan data.

19. A system according to claim 18, wherein the processing unit is further adapted to align and combine the corrected backreach scan data and the corrected boom scan data to generate the mapping of the crane spreader and the crane load target.

20. A method for the operation of a crane, the method comprising the steps of:

generating a mapping of a crane spreader and the crane load target using the method of claim 1;

operating the crane; and continuously tracking the crane spreader and the crane load target.

* * * * *